United States Patent
Lee et al.

(10) Patent No.: US 10,057,936 B2
(45) Date of Patent: Aug. 21, 2018

(54) METHOD AND APPARATUS FOR CONFIGURING USER EQUIPMENT INITIATED MESSAGES FOR DUAL CONNECTIVITY IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/512,769

(22) PCT Filed: Sep. 25, 2015

(86) PCT No.: PCT/KR2015/010167
§ 371 (c)(1),
(2) Date: Mar. 20, 2017

(87) PCT Pub. No.: WO2016/048084
PCT Pub. Date: Mar. 31, 2016

(65) Prior Publication Data
US 2017/0303329 A1    Oct. 19, 2017

Related U.S. Application Data

(60) Provisional application No. 62/056,413, filed on Sep. 26, 2014.

(51) Int. Cl.
*H04W 76/15* (2018.01)
*H04W 76/02* (2009.01)
*H04W 88/08* (2009.01)

(52) U.S. Cl.
CPC ......... *H04W 76/15* (2018.02); *H04W 76/025* (2013.01); *H04W 88/08* (2013.01)

(58) Field of Classification Search
CPC .... H04W 76/025; H04W 88/08; H04W 76/15
See application file for complete search history.

(56) References Cited

U.S. PATENT DOCUMENTS

2015/0223212 A1*  8/2015  Der Velde ............. H04L 5/0032
                                                         370/329
2015/0327280 A1* 11/2015  Zhang ...................... H04L 5/14
                                                         370/280

(Continued)

FOREIGN PATENT DOCUMENTS

EP     2 765 798 A1    8/2014
WO  WO 2014/061001 A1  4/2014

OTHER PUBLICATIONS

3GPP TR 36.842 V12.0.0 (Dec. 2013), Technical Report, 3rd Generation Partnership Project; Technical Specification Group Radio Access Network; Study on Small Cell enhancements for E-UTRA and E-UTRAN; Higher layer aspects (Release 12), 71 pgs.

(Continued)

*Primary Examiner* — Nathan Mitchell
(74) *Attorney, Agent, or Firm* — Birch, Stewart, Kolasch & Birch, LLP

(57) ABSTRACT

A method and apparatus for configuring a user equipment (UE) with an in-device coexistence (IDC) indication message in a wireless communication system is provided. A master evolved NodeB (MeNB) in dual connectivity receives a request to configure the IDC indication message from a secondary eNB (SeNB) in dual connectivity, and upon receiving the request, configures the UE with the IDC indication message.

9 Claims, 5 Drawing Sheets

(56) References Cited

U.S. PATENT DOCUMENTS

2016/0094358 A1* 3/2016 Won .................... H04L 12/1881
 370/230
2016/0380779 A1* 12/2016 Sharma ............. H04W 72/1215
 370/312

OTHER PUBLICATIONS

Catt "Details of IDS function for Dual Connectivity", R2-143534, 3GPP TSG RAN WG2 Meeting #87, Dresden, Germany, Aug. 18-22, 2014, 4 pgs.
LG Electronics, "Handling of IDC for Dual Connectivity", R2-143539, 3GPP TSG-RAN WG2 #87, Dresden, Germany, Aug. 18-22, 2014, 4 pgs.
NEC Corporation, "Other assistance information", R2-142378, 3GPP TSG RAN2 Meeting #86, Seoul, South Korea, May 19-23, 2014, 6 pgs.

* cited by examiner

[Fig. 1]
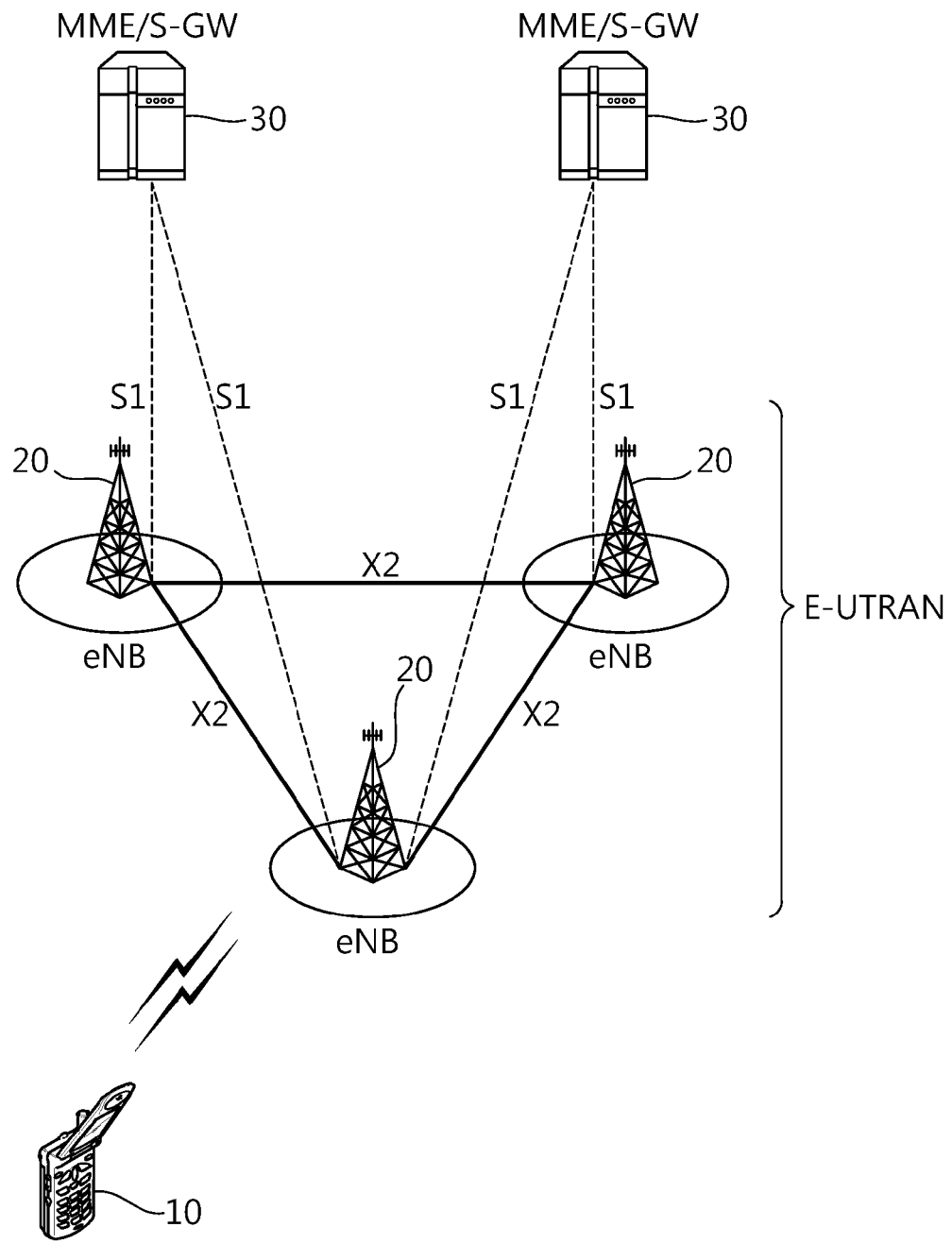

[Fig. 2]
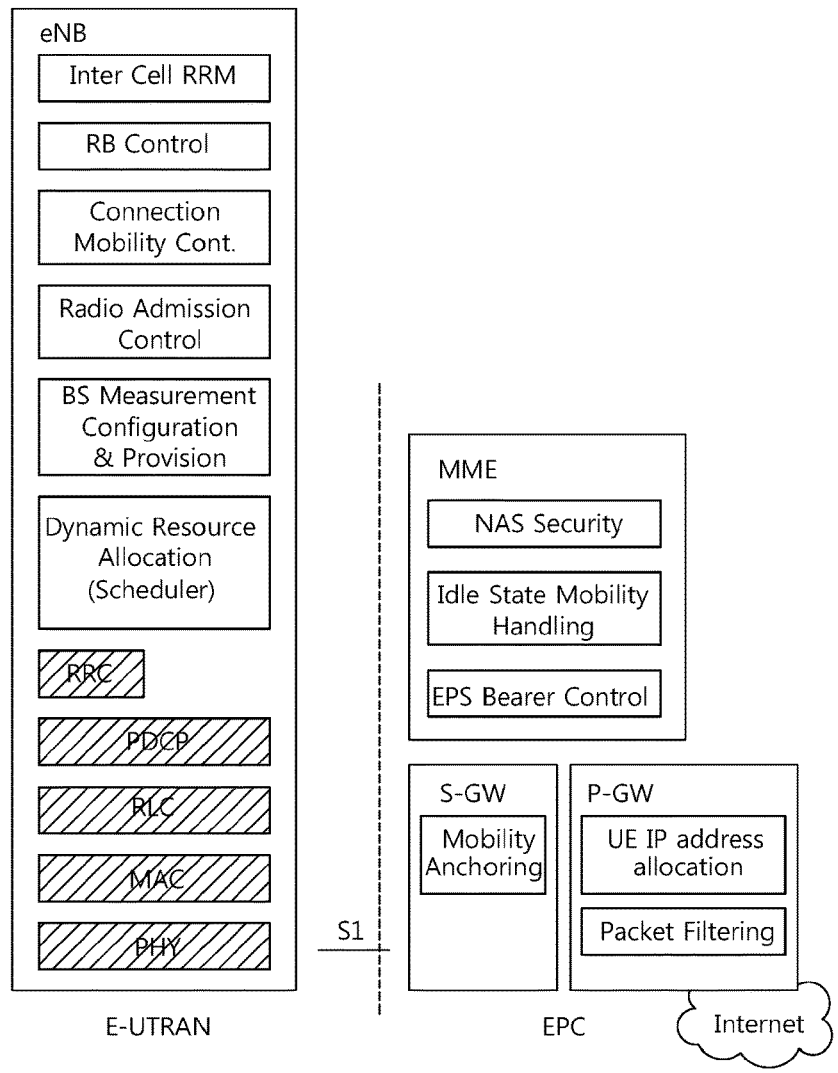
[Fig. 3]
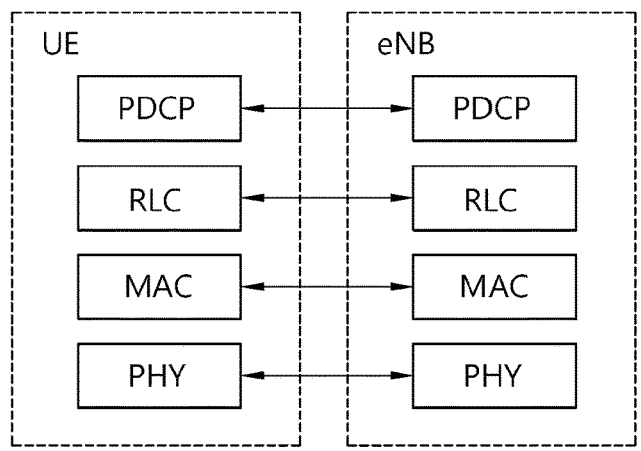

[Fig. 4]
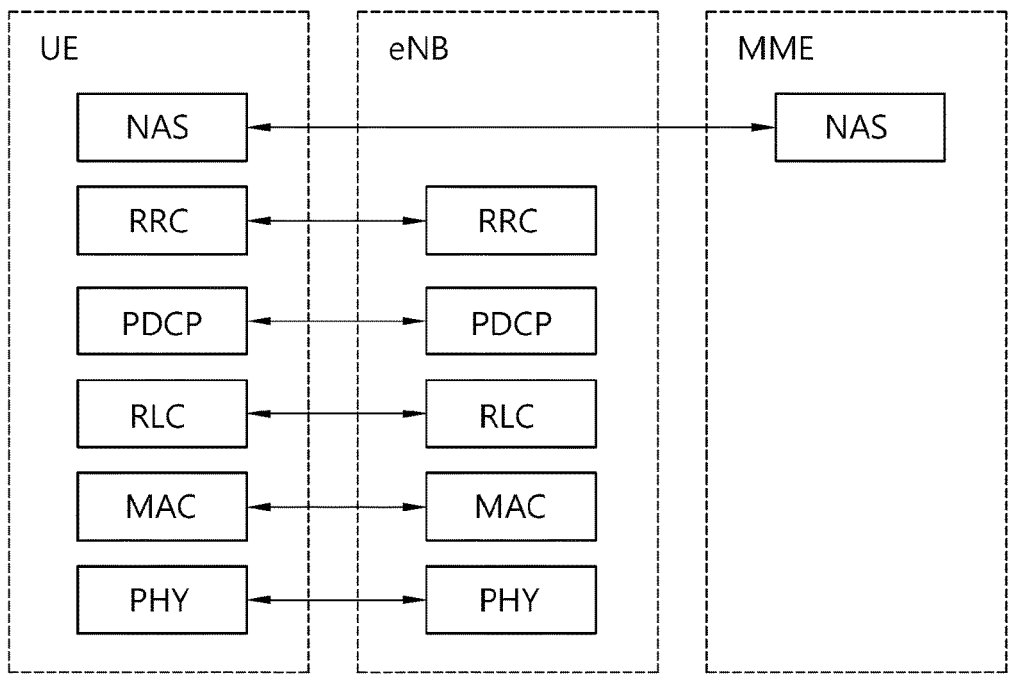
[Fig. 5]
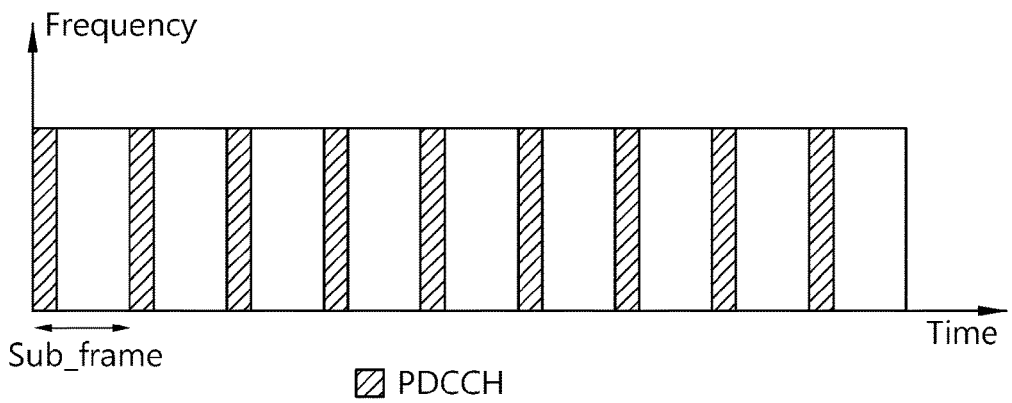
[Fig. 6]
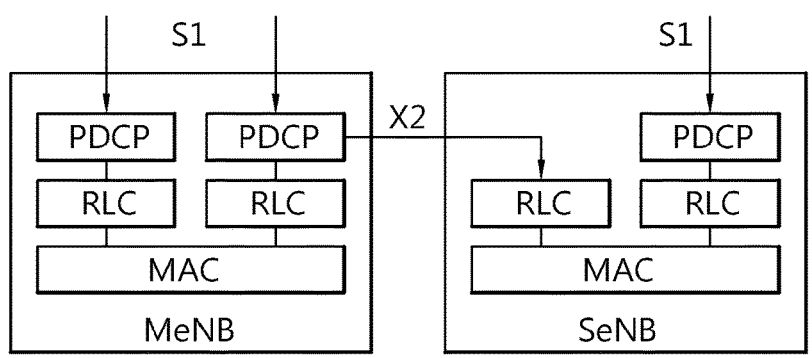

[Fig. 7]
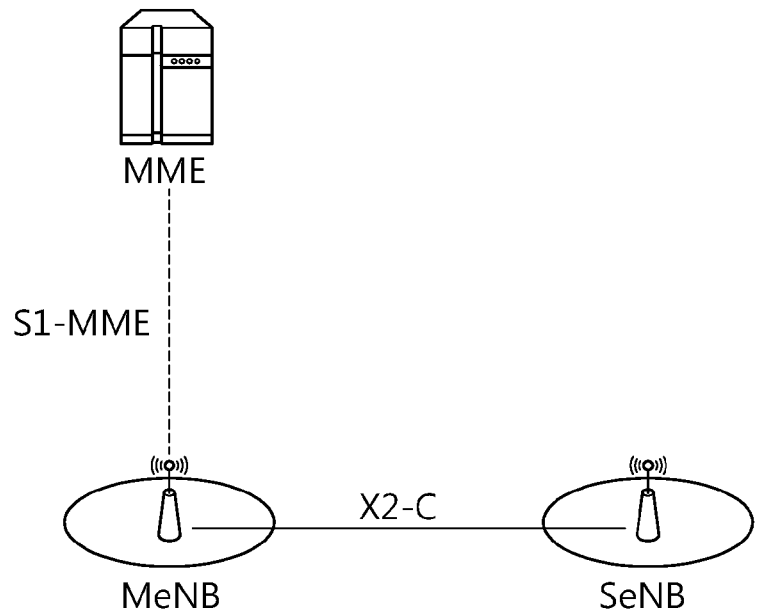
[Fig. 8]
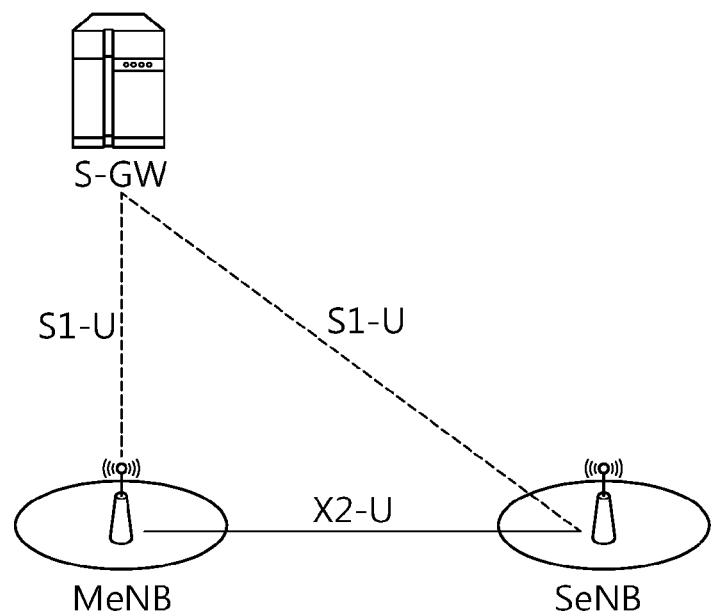

[Fig. 9]
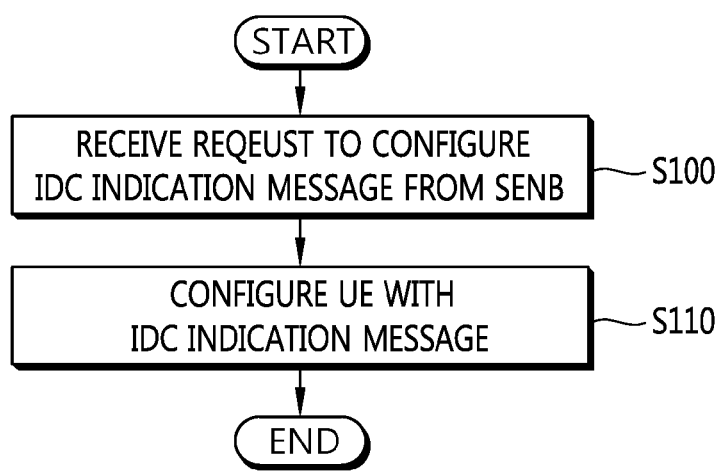
[Fig. 10]
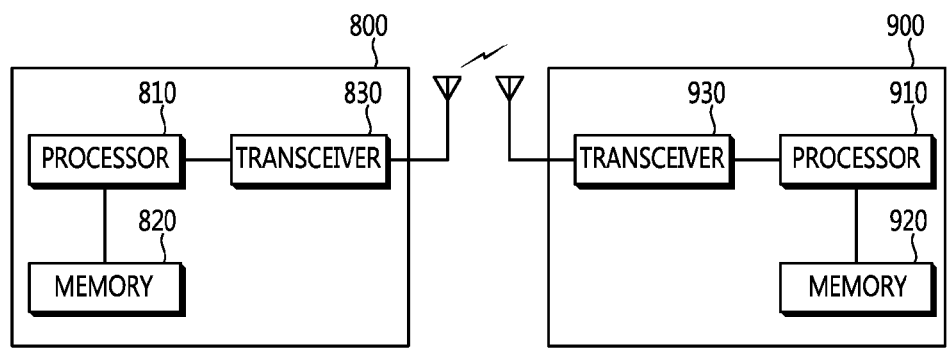

METHOD AND APPARATUS FOR CONFIGURING USER EQUIPMENT INITIATED MESSAGES FOR DUAL CONNECTIVITY IN WIRELESS COMMUNICATION SYSTEM

CROSS REFERENCE TO RELATED APPLICATIONS

This application is the National Phase of PCT International Application No. PCT/KR2015/010167, filed on Sep. 25, 2015, which claims priority under 35 U.S.C. 119(e) to U.S. Provisional Application No. 62/056,413, filed on Sep. 26, 2014, all of which are hereby expressly incorporated by reference into the present application.

TECHNICAL FIELD

The present invention relates to wireless communications, and more particularly, to a method and apparatus for configuring user equipment (UE) initiated messages for dual connectivity in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity (DC) has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs.

In a radio resource control (RRC) layer, UE initiated messages may be configured by dedicated signaling. However, when dual connectivity is configured, how to configure UE initiated messages for dual connectivity may be a problem.

DISCLOSURE OF INVENTION

Technical Problem

The present invention provides a method and apparatus for configuring user equipment (UE) initiated messages for dual connectivity in a wireless communication system. The present invention provides a method and apparatus for configuring a UE with an in-device coexistence (IDC) indication message by request from a secondary evolved NodeB (eNB).

Solution to Problem

In an aspect, a method for configuring, by a master evolved NodeB (MeNB) in dual connectivity, a user equipment (UE) with an in-device coexistence (IDC) indication message in a wireless communication system is provided. The method includes receiving a request to configure the IDC indication message from a secondary eNB (SeNB) in dual connectivity, and upon receiving the request, configuring the UE with the IDC indication message.

In another aspect, a master evolved NodeB (MeNB) in dual connectivity includes a memory, a transceiver, and a processor coupled to the memory and the transceiver, and configured to control the transceiver to receive a request to configure an in-device coexistence (IDC) indication message indication message from a secondary eNB (SeNB) in dual connectivity, and upon receiving the request, configure a user equipment (UE) with the IDC indication message.

Advantageous Effects of Invention

An IDC indication message can be configured efficiently when dual connectivity is configured.

BRIEF DESCRIPTION OF DRAWINGS

FIG. 1 shows LTE system architecture.
FIG. 2 shows a block diagram of architecture of a typical E-UTRAN and a typical EPC.
FIG. 3 shows a block diagram of a user plane protocol stack of an LTE system.
FIG. 4 shows a block diagram of a control plane protocol stack of an LTE system.
FIG. 5 shows an example of a physical channel structure.
FIG. 6 shows radio protocol architecture for dual connectivity.
FIG. 7 shows C-plane connectivity of eNBs involved in dual connectivity for a certain UE.
FIG. 8 shows U-plane connectivity of eNBs involved in dual connectivity for a certain UE.
FIG. 9 shows an example of a method for configuring a UE with an IDC indication message according to an embodiment of the present invention.
FIG. 10 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Overall architecture and network interface for dual connectivity (DC) is described. It may be referred to 3GPP TR 36.842 V12.0.0 (December 2013). The E-UTRAN supports dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB.

In DC, the configured set of serving cells for a UE consists of two subsets: the MCG containing the serving cells of the MeNB, and the SCG containing the serving cells of the SeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

For SCG, the following principles are applied:
   At least one cell in SCG has a configured UL and one of them is configured with physical uplink control channel (PUCCH) resources;
   Upon detection of a physical layer problem or a random access problem on PSCell, or the maximum number of RLC retransmissions has been reached associated with the SCG, RRC connection re-establishment procedure is not triggered/All UL transmissions towards all cells of the SCG are stopped/The UE is not required to monitor PDCCH on any cell of the SCG;
   MeNB is informed by the UE of SCG failure type.
   For split bearer, the data transfer over the MeNB is maintained.
   Only the RLC acknowledged mode (AM) bearer can be configured for the split bearer;
   Like PCell, PSCell cannot be de-activated.

With respect to the interaction between MeNB and SeNB, the following principles are applied:
   The MeNB maintains the radio resource management (RRM) measurement configuration of the UE and may, e.g., based on received measurement reports or traffic conditions or bearer types, decide to ask an SeNB to provide additional resources (serving cells) for a UE.
   Upon receiving the request from the MeNB, a SeNB may create the container that will result in the configuration of additional serving cells for the UE (or decide that it has no resource available to do so).
   For UE capability coordination, the MeNB provides (part of) the AS-configuration and the UE capabilities to the SeNB.
   The MeNB and the SeNB exchange information about UE configuration by means of RRC containers (inter-node messages) carried in X2 messages.
   The SeNB may initiate a reconfiguration of its existing serving cells (e.g., PUCCH towards the SeNB).
   The SeNB decides PSCell within the SCG.
   The MeNB does not change the content of the RRC configuration provided by the SeNB.
   In the case of the SCG addition and SCG SCell addition, the MeNB may provide the latest measurement results for the SCG cell(s).

When adding a new SCG SCell, dedicated RRC signaling is used for sending all required system information of the cell as for CA, except for the SFN acquired from MIB of the PSCell of SCG. For split bearer, UE is configured over which link the UE transmits UL PDCP PDU.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 9, the MeNB is C-plane connected to the MME via S1-MME, the MeNB and the SeNB are interconnected via X2-C.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

In the RRC, the UE initiated messages may be configured by dedicated signaling, and the UE may transmit the UE initiated messages if configured by eNB. The UE initiated messages includes the followings:
   Proximity indication (configured by reportProximityConfig)
   UE assistance information (configured by PowerPrefIndicationConfig)
   In-device coexistence (IDC) indication (configured by idc-Indication in IDC-Config)

The IDC-Config is included in the OtherConfig information element (IE). The OtherConfig IE contains configuration related to other configuration. Table 1 shows an example of the OtherConfig IE.

TABLE 1

-- ASN1STARTOtherConfig-r9 ::= SEQUENCE {reportProximityConfig-r9 ReportProximityConfig-r9 OPTIONAL, -- Need ON ..., [[ idc-Config-r11 IDC-Config-r11 OPTIONAL, -- Need ONpowerPrefIndicationConfig-r11 PowerPrefIndicationConfig- TABLE 1-continued

```
r11 OPTIONAL, -- Need ONobtainLocationConfig-r11 ObtainLocationConfig-r11
OPTIONAL -- Need ON ]]}IDC-Config-r11 ::= SEQUENCE {idc-Indication-r11
ENUMERATED {setup} OPTIONAL, -- Need ORautonomousDenialParameters-r11
SEQUENCE {autonomousDenialSubframes-r11 ENUMERATED {n2, n5, n10,
n15,n20, n30, spare2, spare1},autonomousDenialValidity-r11 ENUMERATED
{sf200, sf500, sf1000, sf2000, spare4, spare3, spare2, spare1}} OPTIONAL, -- Need
OR...}ObtainLocationConfig-r11 ::= SEQUENCE {obtainLocation-r11
ENUMERATED {setup} OPTIONAL -- Need OR}PowerPrefIndicationConfig-r11
::=CHOICE {Release NULL,Setup SEQUENCE{powerPrefIndicationTimer-r11
ENUMERATED {s0, s0dot5, s1, s2, s5, s10, s20, s30, s60, s90, s120, s300, s600,
spare3, spare2, spare1}}}ReportProximityConfig-r9 ::= SEQUENCE
{proximityIndicationEUTRA-r9 ENUMERATED {enabled} OPTIONAL, -- Need
ORproximityIndicationUTRA-r9 ENUMERATED {enabled} OPTIONAL -- Need
OR}-- ASN1STOP
```

Referring to Table 1, the OtherConfig IE includes the IDC-Config. The IDC-Config includes the idc-Indication field, which is used to indicate whether the UE is configured to initiate transmission of the IDC indication message to the network. The IDC-Config further includes the autonomous-DenialSubframes field, which indicates the maximum number of the UL subframes for which the UE is allowed to deny any UL transmission. Value n2 corresponds to 2 subframes, n5 to 5 subframes and so on.

The UE shall:

1> if the received otherConfig includes the idc-Config:

2> if idc-Indication is included (i.e. set to setup):

3> consider itself to be configured to provide the IDC indication message;

2> else:

3> consider itself not to be configured to provide the IDC indication message;

2> if autonomousDenialParameters is included:

3> consider itself to be allowed to deny any transmission in a particular UL subframe if during the number of subframes indicated by autonomousDenialValidity, preceeding and including this particular subframe, it autonomously denied fewer UL subframes than indicated by autonomousDenialSubframes;

2> else:

3> consider itself not to be allowed to deny any UL transmission.

Among the UE initiated messages, it seems clear that the proximity indication message may be configured only by the MeNB when dual connectivity is configured. There seems no case that the proximity indication message is configured by the SeNB, because it is related to mobility.

For the UE assistance information message including the PPI and the IDC indication message, how the UE assistance information message and the IDC indication message may be configured when dual connectivity is configured is shown in Table 2.

TABLE 2

|  | PowerPrefIndicationConfig (Configuration of PPI) | idc-Indication (Configuration of IDC Indication) |
| --- | --- | --- |
| Only MeNB configures the indication | This case seems valid and is already supported by specification | This case is valid and is already supported by specification. |
| Only SeNB configures the indication | It is unclear whether this case is valid. | This case is valid and should be supported by specification. |
| Both MeNB and SeNB configures the indication | This case seems valid. | It is unclear whether this case is valid. |

Regarding the UE assistance information message including the PPI, it is unclear whether the UE assistance information message may be configured only by the SeNB. However, since it seems unlikely that the UE is operating in low power consumption only for the SCG, the case that only the SeNB configures the UE assistance information message including the PPI may not need to be considered. The PPI is related to DRX configuration. Since separate DRX configurations may be applied to the MCG and SCG in dual connectivity, there may be the case that both the MeNB and SeNB are willing to configure PPI. However, there seems no case that the UE provides different values of powerPrefIndication to different eNB. For example, the UE may not indicate lowPowerConsumption to the MeNB while indicating normal to the SeNB. Thus, if the MeNB and SeNB are willing to configure PPI, it seems sufficient that the MeNB alone configures PPI and forwards PPI to the SeNB, assuming that the same value of PPI is applied to both the MeNB and SeNB, when PPI is received from the UE. Dual configurations may happen to the UE if the MeNB and SeNB configure PPI for the same UE.

Regarding the IDC indication message, the IDC indication message may be configured by either the MeNB or SeNB. But, it seems unclear whether or not there is the case that both the MeNB and SeNB are willing to configure the IDC indication message for the same UE. Even though real use case is still unclear, if the SeNB may include such configuration in SCG-Config, both the MeNB and SeNB may configure the IDC indication message or PPI for the same UE. Hence, configuration of the IDC indication message may be duplicated in the UE side. It means that the UE may process dual procedures of IDC indication, one for the MCG and one for the SCG. Such dual configuration is very unusual and undesirable. Thus, it may be preferred that only one configuration of the IDC indication message is available in the UE. Such dual configuration should be avoided.

In order to solve the problem described above regarding the IDC indication message, a method for configuring the UE initiated messages, specifically the IDC indication message, for dual connectivity according to an embodiment of the present invention is described. According to an embodiment of the present invention, dual configuration of the IDC indication message may be avoided either by the UE or the eNB.

(1) UE based solution: The UE may ignore duplicated configuration for idc-Indication in IDC-Config. That is, if the UE is already configured for the IDC indication message, e.g. by receiving idc-Indication in IDC-Config in one RRC connection reconfiguration message, the UE may ignore duplicated configuration for idc-Indication in IDC-Config upon receiving another RRC connection reconfiguration messages including idc-Indication in IDC-Config. For example, if both the MCG and SCG configure the UE with idc-Indication set to 'Setup', the UE may ignore one of the configurations. In this case, the UE may not ignore autonomousDenialParameters in IDC-Config, assuming that autonomousDenialParameters is configured per CG. However, this UE behavior of the UE based solution may seem unusual and not so desirable.

(2) eNB based solution: The SeNB may request the MeNB to configure idc-Indication over X2 interface. Upon receiving the request from the SeNB, the MeNB may configure the UE with idc-Indication set to 'Setup' in IDC-Config over Uu interface, by transmitting an RRC connection reconfiguration message to the UE. In this case, autonomousDenialParameters may be configured by one of the following options:

The SeNB may also request the MeNB to configure autonomousDenialParameters for the UE, and subsequently, the MeNB may configure the UE with autonomousDenialParameters of IDC-Config by transmitting an RRC connection reconfiguration message to the UE.

The SeNB separately includes autonomousDenialParameters of IDC-Config in SCG-Config, and subsequently, the MeNB may transmit an RRC connection reconfiguration message including the autonomousDenialParameters of IDC-Config in SCG-Config.

By the eNB based solution, legacy UE behavior may be kept for configuration of the IDC indication message.

FIG. 9 shows an example of a method for configuring a UE with an IDC indication message according to an embodiment of the present invention.

In step S100, the MeNB in dual connectivity receives a request to configure the IDC indication message from a SeNB in dual connectivity. The request may be received over X2 interface. A UE may be connected to the MeNB and the SeNB in dual connectivity.

Upon receiving the request, in step S110, the MeNB configures the UE with the IDC indication message. Configuring the UE with the IDC indication message may comprise transmitting a RRC connection reconfiguration message, which includes an IDC indication set to 'setup', to the UE.

The MeNB may further receive a request to configure autonomous denial parameters from the SeNB. In this case, the MeNB may further configure the UE with the autonomous denial parameters by transmitting a RRC connection reconfiguration message. Alternatively, the MeNB may further receive autonomous denial parameters from the SeNB. In this case, the MeNB further transmit a RRC connection reconfiguration message including the received autonomous denial parameters. The autonomous denial parameters are received via a SCG configuration.

FIG. 10 shows a wireless communication system to implement an embodiment of the present invention.

A MeNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A SeNB or UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for configuring, by a master evolved NodeB (MeNB) in dual connectivity, a user equipment (UE) with an in-device coexistence (IDC) indication message in a wireless communication system, the method comprising:
receiving a first request to configure the IDC indication message from a secondary eNB (SeNB) in dual connectivity;
upon receiving the first request, configuring the UE with the IDC indication message by transmitting a radio resource control (RRC) connection reconfiguration message to the UE,
wherein the RCC connection reconfiguration message includes an IDC indication field, which is used to indicate whether the UE is configured to initiate a transmission of the IDC indication message;
receiving a second request to configure autonomous denial parameters from the SeNB; and
upon receiving the second request, configuring the UE with the autonomous denial parameters by transmitting the RRC connection reconfiguration message to the UE, wherein the RRC connection reconfiguration message further includes an autonomous denial subframe field, which is used to indicate a maximum number of an uplink subframe for which the UE is allowed to deny any uplink transmission.

2. The method of claim 1, further comprising receiving the autonomous denial parameters from the SeNB.

3. The method of claim 2, further comprising transmitting the RRC connection reconfiguration message including the received autonomous denial parameters.

4. The method of claim 2, wherein the autonomous denial parameters are received via a secondary cell group (SCG) configuration.

5. The method of claim 1, wherein the first request is received over X2 interface.

6. The method of claim 1, wherein the UE is connected to the MeNB and the SeNB in dual connectivity.

7. A master evolved NodeB (MeNB) in dual connectivity comprising:
    a memory;
    a transceiver; and
    a processor coupled to the memory and the transceiver, and configured to:
    control the transceiver to receive a first request to configure an in-device coexistence (IDC) indication message from a secondary eNB (SeNB) in dual connectivity;
    upon receiving the first request, configure a user equipment (UE) with the IDC indication message by transmitting a radio resource control (RRC) connection reconfiguration message to the UE,
    wherein the RRC connection reconfiguration message includes an IDC indication field, which is used to indicate whether the UE is configured to initiate a transmission of the IDC indication message;
    receive second request to configure autonomous denial parameters from the SeNB; and
    upon receiving the second request, configure the UE with the autonomous denial parameters by transmitting the RRC connection reconfiguration message to the UE,
    wherein the RRC connection reconfiguration message further includes an autonomous denial subframe field, which is used to indicate a maximum number of an uplink subframe for which the UE is allowed to deny any uplink transmission.

8. The MeNB of claim 7, wherein the processor is further configured to control the transceiver to receive the autonomous denial parameters from the SeNB.

9. The MeNB of claim 8, wherein the processor is further configured to control the transceiver to transmit the RRC connection reconfiguration message including the received autonomous denial parameters.

* * * * *